Patented Dec. 8, 1953

2,662,046

UNITED STATES PATENT OFFICE 2,662,046

PARENTERAL AMINO ACID SOLUTION

Eugene E. Howe, Bound Brook, N. J., assignor to Merck & Co., Inc., Rahway, N. J., a corporation of New Jersey No Drawing. Application June 19, 1948,
Serial No. 34,151

6 Claims. (Cl. 167—58)

This invention relates to amino acid mixtures and particularly to amino acid solutions of the type adapted for parenteral injection. More particularly, the invention relates to an improved method of adjusting the pH of amino acid mixtures which results in a drastic reduction in toxic effects and objectionable side reactions when such solutions are parenterally administered, and to the new amino acid mixtures thus obtained.

In the past amino acid solutions for parenteral injection have generally been either acid or enzymatic protein hydrolyzates. In these hydrolyzates essential amino acids including both monoamino monocarboxylic acids and the basic amino acids $l$-arginine, $l$-histidine and $l$-lysine are present, and the basicity of the mixture is essentially neutralized by dicarboxylic acids such as glutamic and aspartic acids which are also present in the hydrolyzates. It has been found, however, that the dicarboxylic acids are largely responsible for the nausea and vomiting generally experienced in the parenteral administration of protein hydrolyzates.

In my pending joint application Howe and Tishler Serial No. 637,498, filed December 27, 1945, now United States Patent No. 2,457,820, issued January 4, 1949, there is disclosed a new procedure for fractionating protein acid hydrolyzates to separate monoamino monocarboxylic acid and basic amino acid fractions and recombining such fraction with added amounts of glycine and racemic essential amino acids including tryptophane to form improved amino acid solutions containing the ten natural essential amino acids (arginine, histidine, isoleucine, leucine, lysine, methionine, phenylalanine, threonine, tryptophane and valine) in the physiologically active L-form and characterized as being free of dicarboxylic acids and containing not more than 5% of the essential amino acids in the inactive D-form. In these new amino acid solutions the basicity has heretofore been neutralized with hydrochloric acid.

According to the procedure disclosed in said application Serial No. 637,498, a protein acid hydrolyzate is extracted with butanol to remove a fraction of monoamino monocarboxylic acids and the residual hydrolyzate is then treated with an adsorbent material which preferentially adsorbs basic amino acids. The adsorbed basic amino acids are then eluted with mineral acid, thus effecting a neutralization of the basic amino acids. In accordance with an improved procedure more specifically disclosed in my co-pending joint application Howe and Tishler Serial No. 764,569, filed July 29, 1947, now United States Patent No. 2,480,654 issued August 30, 1949, the basic amino acids are eluted from the adsorbent material with about 20% aqueous ammonia and the eluate is concentrated to remove excess ammonia. When following this procedure the M. A. fraction and the basic fraction are combined and adjusted to a pH of about 6.5–7.0 by addition of hydrochloric acid.

While amino acid solutions neutralized in the manner above described appeared initially to have no detrimental effects, it has been found that presence of hydrochloric acid in the amounts required for the neutralization of the basic amino acids tends at least in some instances to combine with sodium or ammonium ions of the blood and to be excreted in the urine, causing the loss of fixed base and $CO_2$ combining power of the blood.

It has now been discovered in accordance with the present invention that the disadvantages introduced by neutralizing with hydrochloric acid can be wholly avoided and distinctly superior amino acid mixtures can be prepared by employing as the neutralizing agent a physiologically innocuous organic acid.

By physiologically innocuous organic acid is meant any of the group of organic acids which are assimilated and utilized by the body, or organic acids which are formed in the metabolism of foodstuffs and thus occur normally in the body, which when introduced into the bloodstream in high concentration produces no untoward side reactions such as nausea, vomiting, loss of calcium, etc.

Various organic acids are suitable for this purpose including acetic, lactic, pyruvic, and pyrrolidone carboxylic acids. It is considered, however, that lactic acid and pyrrolidone carboxylic acid are the acids best suited for neutralizing the basic amino acids.

It should be noted that the use of physiologically innocuous organic acids in the neutralization not only avoids the objectionable effect on $CO_2$ combining power of the blood after infusion, but also avoids the objectionable nausea and vomiting produced by glutamic and aspartic acids. In addition, the physiologically innocuous acids increase the caloric content of the amino acid solutions as compared with solutions neutralized with hydrochloric acid.

The following examples show how the process of the present invention can be carried out, but it is to be understood that these examples are given by way of illustration and not of limitation.

EXAMPLE 1

*Preferred procedure for fractionating protein acid hydrolyzate*

One kgm. of casein (ash-free moisture-free basis) is placed in a 5 l. flask with 3300 cc. of 25% hydrochloric acid and boiled under reflux for 20 hrs. The mixture is then concentrated to a syrup under reduced pressure. After the volume has been reduced to about one-third of the original volume, the temperature should be kept below 70° C. during further concentration.

The residual syrup is dissolved in about 5 liters of condensed water and filtered through a thin bed of charcoal to remove insoluble humin.

The filtrate (pH 0.5 to 1.0) is then passed through a kilogram of Amberlite IR-4B (an ion exchange polyamine resin prepared according to Example 4 of U. S. Patent No. 2,402,384 issued June 18, 1946, to J. W. Eastes), arranged in a column about 3 ft. long. The Amberlite is prepared for use by treating with 5% hydrochloric acid, then treating with 10% sodium hydroxide, and washing to pH 7-8.

The filtrate is passed through the column at a rate of about 200 cc./min. and the column is washed with 2-3 l. of water at the same rate. The effluent and washings are collected until the pH reaches 5, and are then agitated for 10-15 min. with about 100 gm. of charcoal. The charcoal is then filtered off and the filtrate is concentrated to about 5 l. At this point, the nitrogen content is about 2.8 gm./100 cc. which represents a loss of only about 3% of that in the original casein. The solution is chilled to 0-5° C. for about 8 hours causing precipitation of tyrosine which is removed by filtration.

The hydrolyzate is then placed in a semi-continuous liquid extractor and extracted with about 20 volumes of butanol at such a pressure (approximately 60 mm. Hg) that the temperature does not exceed about 65° C. The time for extraction is about 36 hours. The butanol containing the precipitated M. A. fraction, i. e. monamino monocarboxylic acids, is chilled to 0-5° C. for about 8 hours, then filtered, and the precipitate is washed with two 250 cc. portions of dry butanol and then with two 250 cc. portions of ether. The precipitate is then dried to constant weight in air at 55° C. The yield of dry M. A. fraction thus obtained is approximately 250 gm., from the kilogram of casein initially treated. (This product contains essential monoamino monocarboxylic acids in approximately the following amounts: isoleucine, 15%; leucine, 31%; methionine, 8%; phenylalanine, 11%; threonine, 3.5%; and valine, 13%.)

The butanol-extracted hydrolyzate is concentrated to about 4 liters for removal of dissolved butanol and passed through a 6 ft. column containing 2000 gm. of Zeokarb NH4 or Amberlite IR-100 (moisture-free basis) at the rate of about 300 cc. per min. The column is prepared as follows: Fill an 8 ft. length of 60 mm. glass tubing half full of water and introduce 2000 gm. of Zeokarb H (10% moisture) or 2000 gm. of Amberlite IR-100. (Zeokarb H is a sulfonated coal, and Amberlite IR-100 is a modified phenol formaldehyde methylol sulfonic acid type resin.) The column is washed with condensed water until the wash is relatively free of color. Six liters of 20% aqueous ammonia is then passed through the column at 300 cc. per min., and the column is then washed with about 20 liters of condensed water. The column is now ready for treatment of the basic amino acid fraction, although final "conditioning" of the column is effected by the initial run of basic amino acids. Thus the first batch of basic fraction treated in a column should be tested separately for tolerance and toxicity.

The butanol-extracted hydrolyzate is now passed through the column, the basic amino acids being adsorbed on the resin. It is found that approximately 2000 gm. of resin to 1 kilo of original casein will completely adsorb without breakthrough the basic amino acids present in the extracted hydrolyzate.

The column is then eluted with 6 liters of 20% ammonia. The collected eluate is concentrated to about 1.75 liters and on analysis is found to contain about 25 gm. of arginine, 25 gm. of histidine and 70 gm. of lysine. This is approximately 90% of the basic amino acids present in the hydrolyzate from one kilo of casein.

The M. A. fraction and the basic fraction thus prepared are ready for use in preparing solutions containing balanced mixtures of essential amino acids. The following examples show how such mixtures can be prepared.

EXAMPLE 2

A casein acid hydrolyzate was treated in accordance with the procedure described in Example 1 to prepare separate monoamino monocarboxylic acid and basic amino acid fractions.

55 gms. of the monoamino carboxylic acid fraction was dissolved in 600 cc. of distilled water by heating to 65-70° C. To this solution was added 100 cc. of basic fraction containing approximately 10 gm. of l-lysine, 3.0 gm. of l-arginine, and 2.7 gm. of l-histidine. The resultant solution was filtered through a thin layer of charcoal and was neutralized to pH 7 with 7.0 gm. of lactic acid. 22.6 gm. of glycine was added to the effluent solution and its pH was adjusted to 7.4.

The volume was adjusted to one liter after which 10.0 gm. of Darco was added and the solution was filtered into a pyrogen free flask. Oxygen was expelled by passing nitrogen into the solution and 1.8 gm. of dl-tryptophane was added and dissolved by shaking. To this 0.5 gm. of sodium bisulfite was added, and the solution was sterilized by filtration and transferred sterilely to 500 cc. serum bottles.

EXAMPLE 3

The procedure of Example 2 was repeated using glacial acetic acid in place of lactic acid to effect neutralization. Approximately 4.5 gms. of glacial acetic acid was required to neutralize to pH 7.

EXAMPLE 4

The procedure of Example 2 was repeated using l-pyrrolidone carboxylic acid in place of lactic acid to effect neutralization. Approximately 5 gms. of l-pyrrolidone carboxylic acid was required to neutralize to pH 7.

EXAMPLE 5

The procedure of Example 2 was repeated using pyruvic acid in place of lactic acid to effect neutralization. Approximately 5 gms. of pyruvic acid was required to neutralize to pH 7.

It will be understood that in the foregoing procedures solutions can be neutralized to any pH suitable for infusion into humans. Thus the pH may be adjusted by addition of a physiologically innocuous organic acid to any desired point within a range of about pH 4.5 to 8.

A number of clinical tests conducted by different investigators using amino acid preparations neutralized as described in the foregoing examples have shown that these amino acid mixtures do not produce changes in the CO₂ combining power of the blood characteristic of acidosis, and that these mixtures are better tolerated in man than similar mixtures neutralized with hydrochloric acid which were previously employed.

Various changes and modifications in the foregoing procedure will occur to those versed in the art, and to the extent that such changes and modifications fall within the purview of the appended claims it is to be understood that they constitute part of my invention.

I claim:

1. A parenteral solution of amino acids containing not more than 5% of the essential amino acids in the inactive D-form, solute components of said solution being free of dicarboxylic acids and comprising the natural essential amino acids, leucine, isoleucine, phenylalanine, valine, methionine, threonine, arginine, histidine, and lysine, racemic amino acids including tryptophane, the non-essential amino acid glycine, and an amount of a physiologically innocuous organic acid sufficient to neutralize the basicity of the basic amino acids arginine, histidine, and lysine.

2. A parenteral solution for amino acids containing not more than 5% of the essential amino acids in the inactive D-form, solute components of said solution being free of dicarboxylic acids and comprising the natural essential amino acids, leucine, isoleucine, phenylalanine, valine, methionine, threonine, arginine, histidine, and lysine, racemic amino acids including tryptophane, the non-essential amino acid glycine, and an amount of lactic acid sufficient to neutralize the basicity of the basic amino acids arginine, histidine, and lysine.

3. A parenteral solution for amino acids containing not more than 5% of the essential amino acids in the inactive D-form, solute components of said solution being free of dicarboxylic acids and comprising the natural essential amino acids, leucine, isoleucine, phenylalanine, valine, methionine, threonine, arginine, histidine, and lysine, racemic amino acids including tryptophane, the non-essential amino acid glycine, and an amount of pyrrolidone carboxylic acid sufficient to neutralize the basicity of the basic amino acids arginine, histidine, and lysine.

4. A parenteral solution for amino acids containing not more than 5% of the essential amino acids in the inactive D-form, solute components of said solution being free of dicarboxylic acids and comprising the natural essential amino acids, leucine, isoleucine, phenylalanine, valine, methionine, threonine, arginine, histidine, and lysine, racemic amino acids including tryptophane, the non-essential amino acid glycine, and an amount of pyruvic acid sufficient to neutralize the basicity of the basic amino acids arginine, histidine, and lysine.

5. A parenteral solution for amino acids containing not more than 5% of the essential amino acids in the inactive D-form, solute components of said solution being free of dicarboxylic acids and comprising the natural essential amino acids, leucine, isoleucine, phenylalanine, valine, methionine, threonine, arginine, histidine, and lysine, racemic amino acids including tryptophane, the non-essential amino acid glycine, and an amount of acetic acid sufficient to neutralize the basicity of the basic amino acids arginine, histidine, and lysine.

6. A parenteral solution of amino acids containing not more than 5% of the essential amino acids in the inactive D-form, solute components of said solution being free of dicarboxylic acids and comprising the natural essential amino acids, leucine, isoleucine, phenylalanine, valine, methionine, threonine, arginine, histidine, and lysine, racemic amino acids including tryptophane, the non-essential amino acid glycine, and a physiologically innocuous organic acid selected from the group consisting of lactic acid, acetic acid, pyruvic acid and pyrrolidone carboxylic acid in an amount sufficient to neutralize the basicity of the basic amino acids, arginine, histidine and lysine.

EUGENE E. HOWE.

References Cited in the file of this patent

UNITED STATES PATENTS

| Number | Name | Date |
|---|---|---|
| 1,489,181 | Weidner | Apr. 1, 1924 |
| 2,101,867 | Miller | Dec. 14, 1937 |
| 2,416,956 | Sahyun | Mar. 4, 1947 |
| 2,457,117 | Bernardi | Dec. 28, 1948 |
| 2,457,820 | Howe et al. | Jan. 4, 1949 |
| 2,462,597 | Block | Feb. 22, 1949 |

OTHER REFERENCES

Hartmann, American Journal Pharm., November 1934, pages 424 to 435.

Madden et al., Journal of Experimental Medicine, volume 79, June 1, 1944, pages 607 to 624, page 622 relied upon.

Sahyun, Outline of the Amino Acids and Proteins, Reinhold Publishing Company, New York, 1944, page 128.

Physicians' Bulletin, June 1947, page 81.

Drug and Cosmetic Industry, August 1945, page 240.